US009293123B2

(12) United States Patent
Fan

(10) Patent No.: US 9,293,123 B2
(45) Date of Patent: Mar. 22, 2016

(54) PORTABLE GUITAR STAND

(71) Applicant: K.H.S. MUSICAL INSTRUMENT CO., LTD., New Taipei (TW)

(72) Inventor: Liang Fan, New Taipei (TW)

(73) Assignee: K.H.S. MUSICAL INSTRUMENT CO., LTD., New Taipei (TW)

( * ) Notice: Subject to any disclaimer, the term of this patent is extended or adjusted under 35 U.S.C. 154(b) by 72 days.

(21) Appl. No.: 14/457,314

(22) Filed: Aug. 12, 2014

(65) Prior Publication Data

US 2015/0161975 A1    Jun. 11, 2015

(30) Foreign Application Priority Data

Dec. 6, 2013    (TW) .............................. 102222947 U

(51) Int. Cl.
  *G10G 5/00*    (2006.01)
  *F16M 11/38*   (2006.01)
  *G10D 1/08*    (2006.01)

(52) U.S. Cl.
  CPC ................. *G10G 5/00* (2013.01); *F16M 11/38* (2013.01); *G10D 1/08* (2013.01)

(58) Field of Classification Search
  USPC ......... 248/169, 171, 165, 166, 434, 168, 170, 248/436, 440.1; 211/85.6, 189, 195, 198; 84/DIG. 3, 453, 327
  See application file for complete search history.

(56) References Cited

U.S. PATENT DOCUMENTS

| | | | | |
|---|---|---|---|---|
| 5,664,756 A * | 9/1997 | Liao | .......................... | G10G 5/00 248/443 |
| 5,973,244 A * | 10/1999 | McCulloch | .............. | G10G 5/00 248/121 |
| D575,293 S * | 8/2008 | Derry | .......................... | D14/447 |
| D636,397 S * | 4/2011 | Green | .......................... | D14/447 |
| 8,146,870 B1 * | 4/2012 | Cooper | .................... | G10G 5/00 248/150 |
| 8,796,525 B2 * | 8/2014 | Sawhney | .................. | G10G 5/00 84/453 |
| 9,010,700 B1 * | 4/2015 | Cooper | .................. | F16M 11/38 248/166 |
| 2008/0028912 A1 * | 2/2008 | Sawhney | .................. | G10G 5/00 84/327 |
| 2009/0277320 A1 * | 11/2009 | Wallis | ...................... | G10G 5/00 84/327 |
| 2011/0168863 A1 * | 7/2011 | Tregloan | .................. | G10G 5/00 248/435 |
| 2013/0048804 A1 * | 2/2013 | Furuta | ...................... | G10G 5/00 248/168 |

* cited by examiner

*Primary Examiner* — Alfred J Wujciak
(74) *Attorney, Agent, or Firm* — patenttm.us

(57) ABSTRACT

A portable guitar stand has two stand racks, two supporting racks and two holding racks. The stand racks are pivotally connected to each other. The supporting racks are respectively and pivotally connected to the stand racks. The holding racks are respectively and pivotally connected to the stand racks. The holding rack and the supporting rack are pivotally connected to different sides of the corresponding stand rack. When the guitar stand is folded, the stand racks, the supporting racks and the holding racks are parallel to each other. When expanded, the supporting racks and the holding racks, which extend toward different sides, may firmly support the guitar on the guitar stand. When folded, the stand racks, the supporting racks and the holding racks are parallel to each other, thereby lowering the volume of the guitar stand for ease of transportation and storage.

18 Claims, 11 Drawing Sheets

PORTABLE GUITAR STAND

CROSS-REFERENCE TO RELATED APPLICATIONS

This application is based upon and claims priority under 35 U.S.C. 119 from Taiwan Patent Application No. 102222947 filed on Dec. 6, 2013, which is hereby specifically incorporated herein by this reference thereto.

BACKGROUND OF THE INVENTION

1. Field of the Invention

The present invention relates to a portable guitar stand, especially to a portable guitar stand that is foldable for convenience of transportation and storage.

2. Description of the Prior Arts

The guitar is a very common music instrument. For either professional performances or amateur entertainment, the guitar is often a primary or secondary instrument. The guitar player holds the guitar to play, but when the playing is ended and the player wants to put down the guitar, the guitar can only be laid flatly on the ground or leaned against the wall. Laying the guitar flatly on the ground not only occupies large space, but also interferes with people passing by. However, leaning the guitar against the wall may result in the guitar transversely sliding, falling down, and hitting on the ground since a bottom of the guitar is not transversely fixed to the ground. The impact upon hitting the ground may damage the guitar.

As a result, a guitar stand is invented for the user to put the guitar on the stand. A conventional guitar stand comprises multiple stand posts, an upright supporting post, and a bottom support post. The stand posts vertically abut the ground to make the guitar stand firmly stand on the ground. The upright supporting post protrudes upward to abut and support the body of the guitar. The bottom supporting post transversely abuts a side of the bottom of the guitar to hold the guitar, thereby preventing the guitar from sliding. However, the conventional guitar stand's volume is too large, which makes the conventional guitar stand difficult to be transported and stored. Transporting the conventional guitar stand becomes a huge burden when the guitar player moves to another venue to perform. Settling multiple guitar stands respectively on different venues is also an economic burden.

To overcome the shortcomings, the present invention provides a portable guitar stand to mitigate or obviate the aforementioned problems.

SUMMARY OF THE INVENTION

The main objective of the present invention is to provide a portable guitar stand that is convenient for transportation and storage.

The portable guitar stand has two stand racks, two supporting racks, and two holding racks. The stand racks are pivotally connected to each other. The supporting racks are respectively and pivotally connected to the stand racks. The holding racks are respectively and pivotally connected to the stand racks. The holding rack and the supporting rack are pivotally connected to different sides of the corresponding stand rack. When the guitar stand is folded, the stand racks, the supporting racks, and the holding racks are parallel to each other.

When expanded, the supporting racks and the holding racks, which extend toward different sides, may firmly support the guitar on the guitar stand. When folded, the stand racks, the supporting racks and the holding racks are parallel to each other, thereby lowering the volume of the guitar stand to facilitate convenience in transportation and storage.

Other objectives, advantages and novel features of the invention will become more apparent from the following detailed description when taken in conjunction with the accompanying drawings.

BRIEF DESCRIPTION OF THE DRAWINGS

FIG. 2 is an exploded perspective view of the portable guitar stand in

DETAILED DESCRIPTION OF THE PREFERRED EMBODIMENTS

Figure 1:
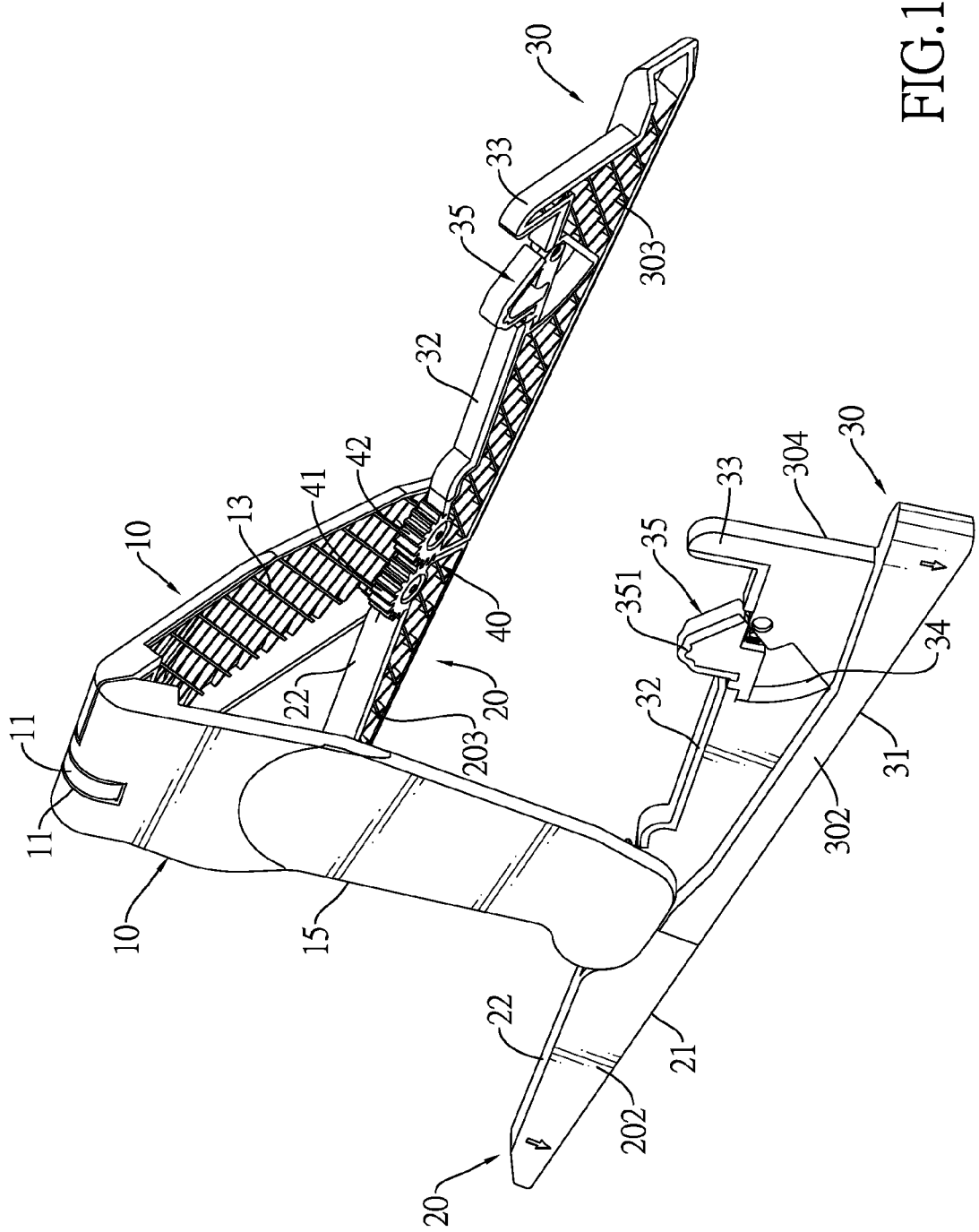
FIG. 1 is a perspective view of a portable guitar stand in accordance with the present invention, shown expanded.
Figure 2:
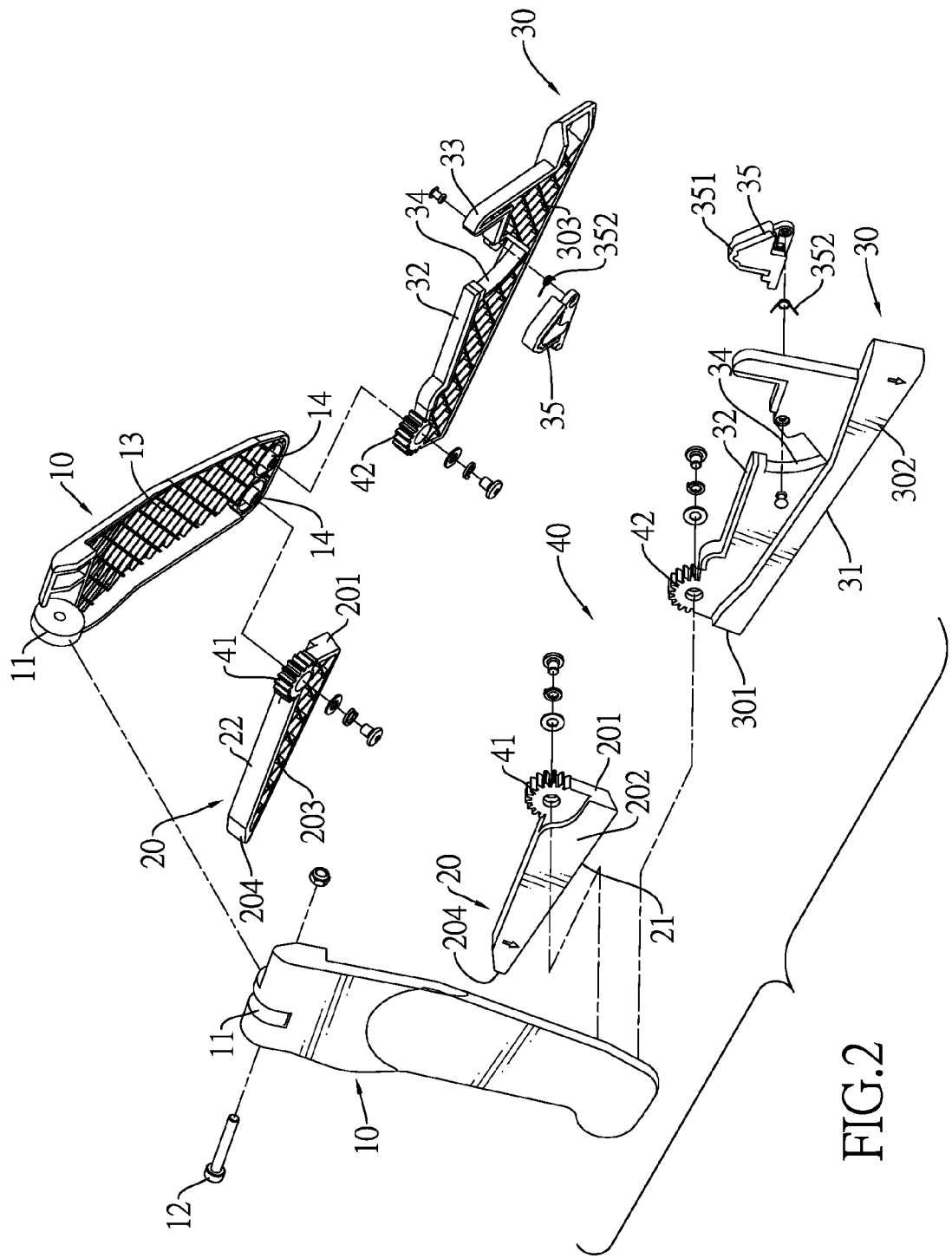

With reference to FIGS. 1 and 2, a portable guitar stand in accordance with the present invention comprises two stand racks 10, two supporting racks 20, and two holding racks 30. In a preferred embodiment, the portable guitar stand further comprises two synchronizing assemblies 40.

Figure 3:
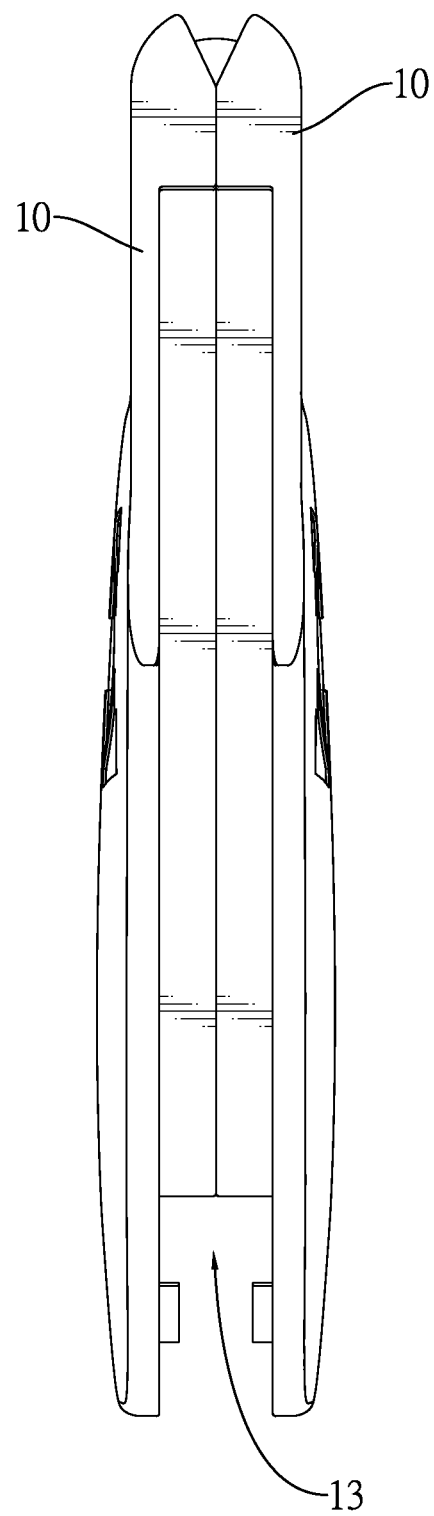
FIG. 3 is a side view of the portable guitar stand in FIG. 1, showing stand racks folded.

With reference to FIGS. 2 and 3, the stand racks 10 are pivotally connected to each other. Each stand rack 10 has a pivot seat 11 disposed in a top of the stand rack 10. A pintle 12 is mounted through the pivot seats 11 of the stand racks 10 to pivotally connect the stand racks 10. In a preferred embodiment, the pivot seat 11 of one of the stand racks 10 is a protrusion, and protrudes from the top of said stand rack 10. The pivot seat 11 of the other stand rack 10 is a recess, and is formed in the top of said stand rack 10. The protrusion is mounted in the recess, and the pintle 12 is mounted trough the protrusion and the recess to pivotally connect the stand racks 10. Each stand rack 10 has an accommodating space 13 formed in an inner surface of the stand rack 10 as shown in FIG. 3. When the stand racks 10 are rotated to be parallel to each other, the accommodating spaces 13 connect and communicate with each other. Each stand rack 10 has two sleeves 14 formed on the inner surface of the stand rack 10 and adjacent to a bottom of the stand rack 10. Each stand rack 10 has a side edge surface 15 inclined from top to bottom.

Figure 4:
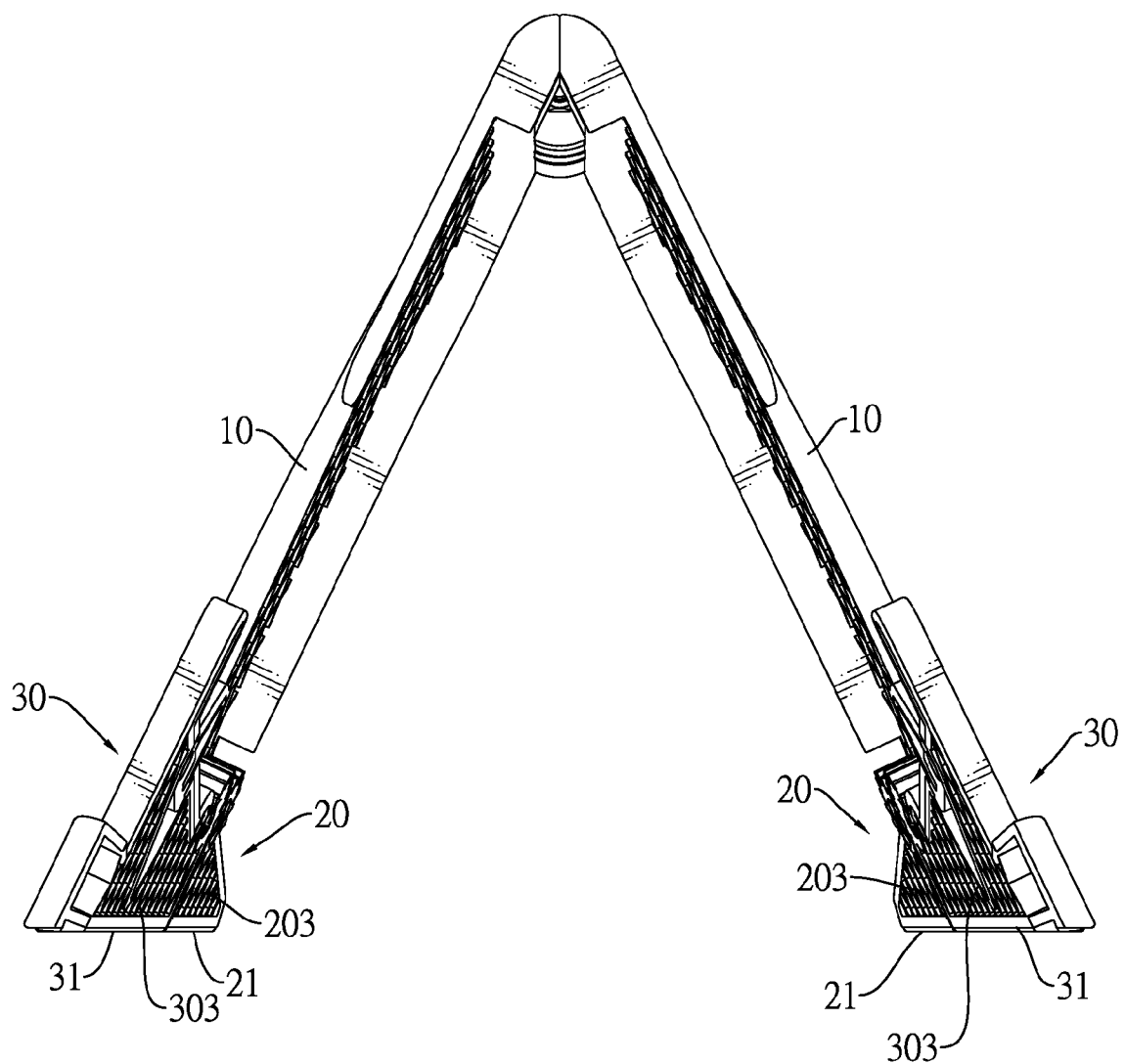
FIG. 4 is a side view of the portable guitar stand in FIG. 1, shown expanded.

With reference to FIGS. 1, 2 and 4, the supporting racks 20 are respectively and pivotally connected to the stand racks 10. Each supporting rack 10 has a pivot end 201 and a free end 204. In a preferred embodiment, the pivot end 201 is pivotally connected to the stand rack 10 at a position on the inner surface of the stand rack 10 and adjacent to the bottom of the stand rack 10. Each supporting rack 20 has a bottom edge surface 21 and a top edge surface 22. The bottom edge surface 21 is transversely inclined from an outer side 202 to an inner side 203 of the supporting rack 20. Thus, when the stand rack 10 is expanded, the bottom edge surface 21 is inclined at an angle such that the bottom edge surface 21 is flush with the ground as shown in FIG. 4 to support the guitar stand. A height of each supporting rack 20 is decreased from the pivot end 201 to the free end 204, such that the top edge surface 22 of the supporting rack 20 is inclined from the pivot end 201 to the free end 204.

With reference to FIGS. 1, 2 and 4, the holding racks 30 are respectively and pivotally connected to the stand racks 10, and the holding rack 30 and the supporting rack 20 are pivotally connected to different sides of the corresponding stand rack 10. Each holding rack 30 has a pivot end 301 and a free end 304. In a preferred embodiment, the pivot end 301 is pivotally connected to the stand rack 10 at a position on the inner surface of the stand rack 10 and adjacent to the bottom of the stand rack 10. Each holding rack 30 has a bottom edge surface 31, a top edge surface 32, a stop 33, a panel recess 34, and a rotatable holding panel 35. The bottom edge surface 31 is transversely inclined from an outer side 302 to an inner side 303 of the holding rack 30. Thus, when the stand rack 10 is expanded, the bottom edge surface 31 is inclined at an angle such that the bottom edge surface 31 is flush with the ground as shown in FIG. 4 to support the guitar stand. The stop 33 is formed on the free end 304 and protruding from the top edge surface 32. The panel recess 34 is formed in the top edge surface 32. The rotatable holding panel 35 is pivotally mounted in the panel recess 34. A torsion spring 352 is mounted on a pivot junction between the rotatable holding panel 35 and the holding rack 30, and presses the rotatable holding panel 35 to make a top edge 351 of the rotatable holding panel 30 protrude out of the top edge surface 32 of the holding rack 30.

With reference to FIGS. 1 and 2, each synchronizing assembly 40 is mounted between the pivot end 201 of one of the supporting racks 20 and the pivot end 301 of the corresponding holding rack 30 to make the supporting rack 10 and the holding rack 30 rotate synchronically. In a preferred embodiment, each synchronizing assembly 40 has a first gear 41 and a second gear 42. The first gear 41 is mounted securely to the pivot end 201 of the corresponding supporting rack 20, and is pivotally connected to the corresponding sleeve 14 of the corresponding stand rack 10. The second gear 42 is mounted securely to the pivot end 301 of the corresponding holding rack 30, is pivotally connected to the corresponding sleeve 14 of the corresponding stand rack 10, and engages with the first gear 41. Preferably, the first gear 41 is integrally formed on the pivot end 201 of the supporting rack 20, and the second gear 42 is formed integrally on the pivot end 301 of the holding rack 30.

Figure 5:
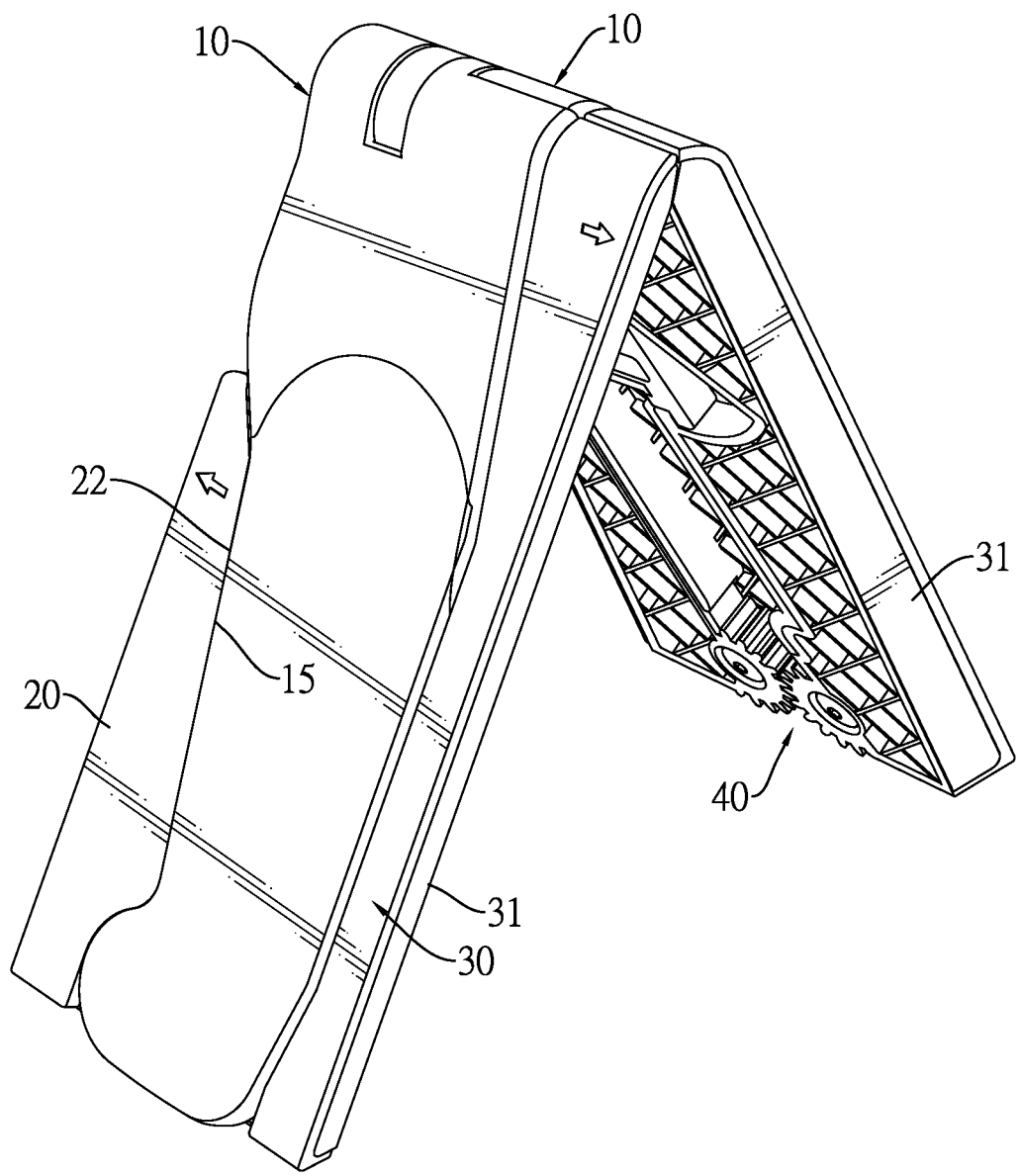
FIG. 5 is a perspective view of the portable guitar stand in FIG. 1, showing the stand racks expanded.

With reference to FIGS. 1 and 5, to expand the portable guitar stand, the stand racks 10 are rotated to be unparallel with each other, and then the supporting stands 20 or the holding stands 30 are pulled out. The synchronizing assemblies 40 make the supporting stands 20 and the holding stands 30 rotate synchronically. The supporting racks 20 and the holding racks 30 are rotated until the bottom edge surfaces 21, 31 abut the ground, which also means the bottom edge surfaces 21, 31 are in the same plane. At this time, the guitar stand is expanded, and firmly stands on the ground with the support of the supporting racks 20 and the holding racks 30. Then a guitar may be put on the guitar stand and abuts the stand racks 10.

Figure 6:
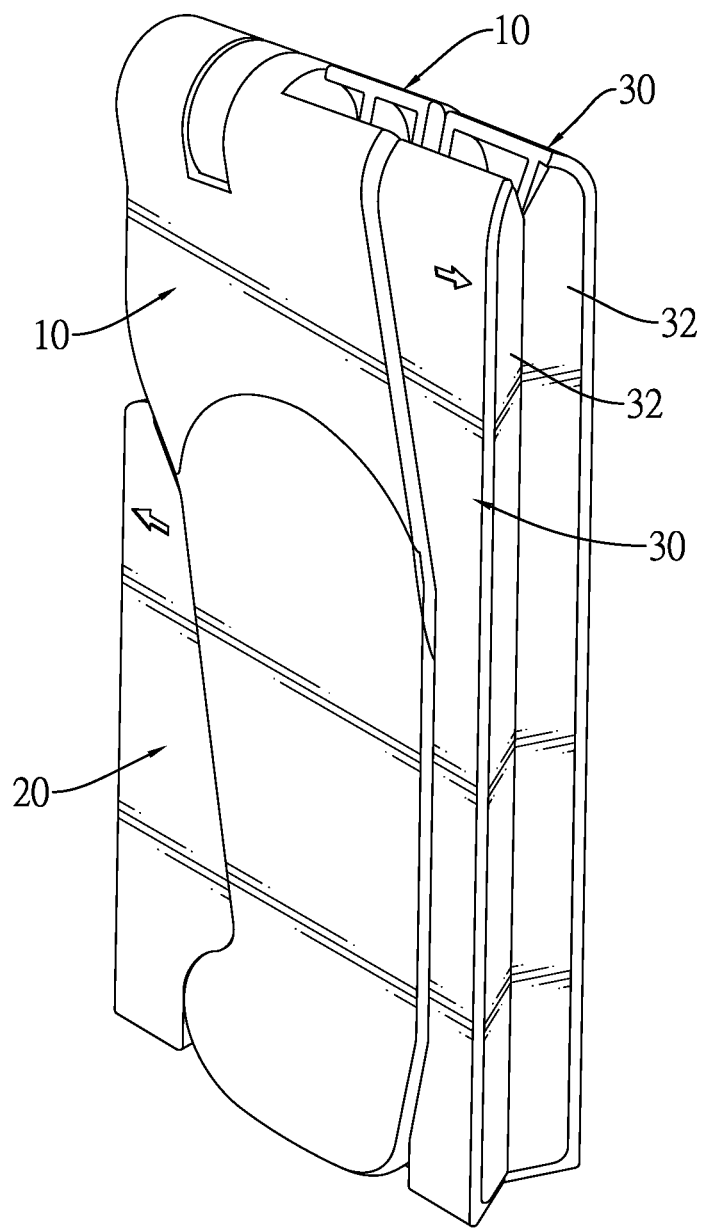
FIG. 6 is a perspective view of the portable guitar stand in FIG. 1, shown folded.
Figure 7:
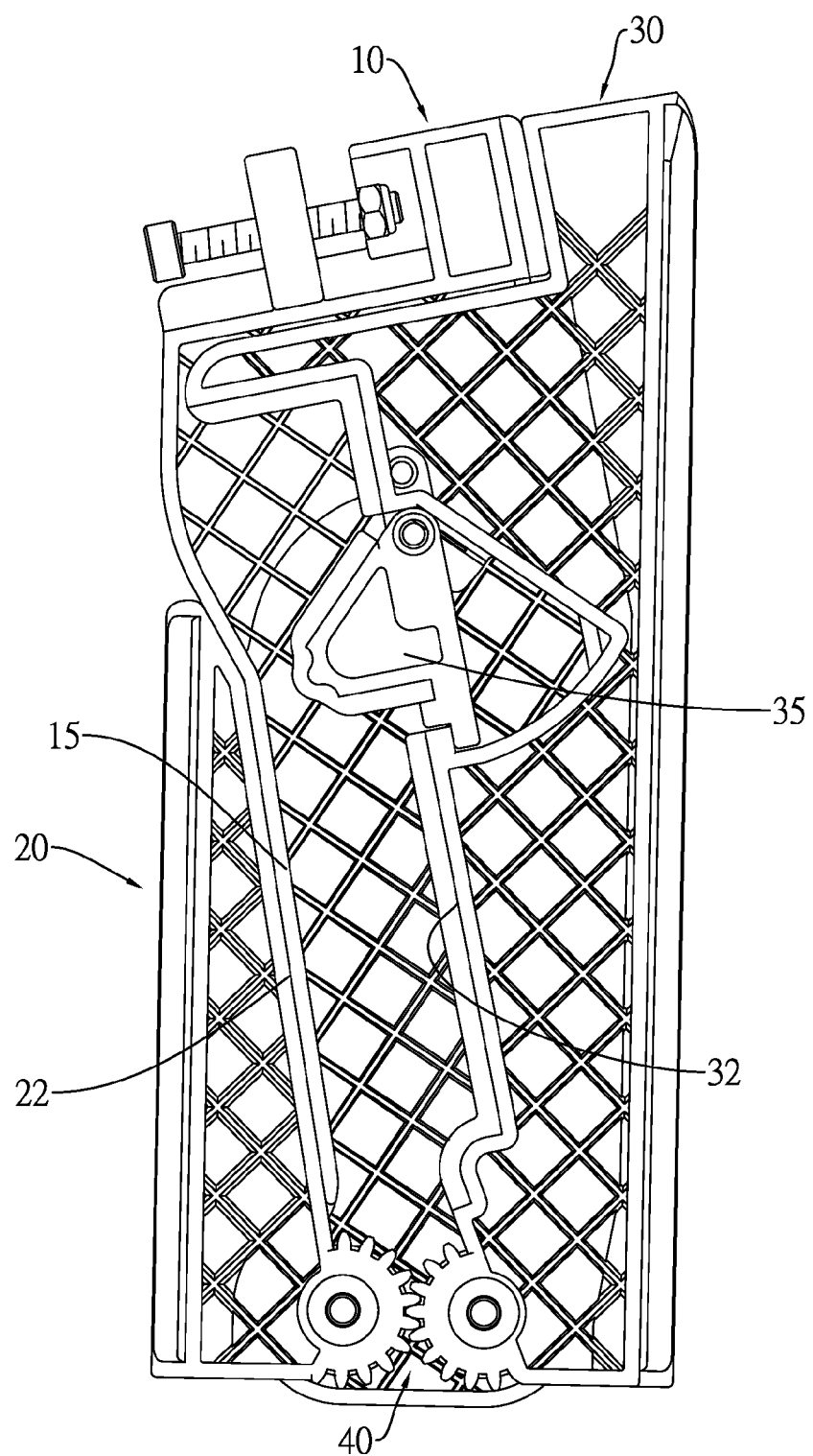
FIG. 7 is a side view of partial components of the portable guitar stand in FIG. 1, showing folded.

With reference to FIGS. 1 and 5 to 7, to fold the portable guitar stand, one of the supporting rack 20 and the holding rack 30 is pushed to rotate, such that the other one of the two racks 20, 30 is synchronically rotated by the synchronizing assemblies 40. The holding racks 30 are rotated to be accommodated in the accommodating spaces 13 of the stand racks 10 as shown in FIG. 3. The supporting racks 20 are rotated until the top edge surfaces 22 abut the side edge surfaces 15 of the stand racks 10 as shown in FIGS. 5 and 7. Finally, the stand racks 10 are rotated until the stand racks 10 are parallel to each other, such that the stand racks 10, the supporting racks 20 and the holding racks 30 are also parallel to each other as shown in FIG. 6. Thus, the volume of the portable guitar stand is lowered, and the folded portable guitar stand becomes planar, which facilitates ease of transportation and storage. As a result, the portable guitar stand has a reduced volume when folded by the pivot connection between the stand racks 10, the supporting racks 20, and the holding racks 30, and thus is convenient in transportation and storage.

The portable guitar stand may be implemented without the synchronizing assemblies 40, as long as the supporting racks 20 and the holding racks 30 are respectively rotated for folding or expanding. The synchronizing assemblies 40 help the user operate the guitar stand. The user only has to rotate one of the supporting rack 20 and the holding rack 30, and both of the supporting rack 20 and the holding rack 30 are rotated synchronically. In addition, the first gear 41 and the second gear 42 enhance the stability when the guitar stand is folded and expended. The engagement between the gears 41, 42 also can fix the supporting rack 20 and the holding rack 30 at a specific angle to be folded or expanded when no external force is applied.

Figure 8:
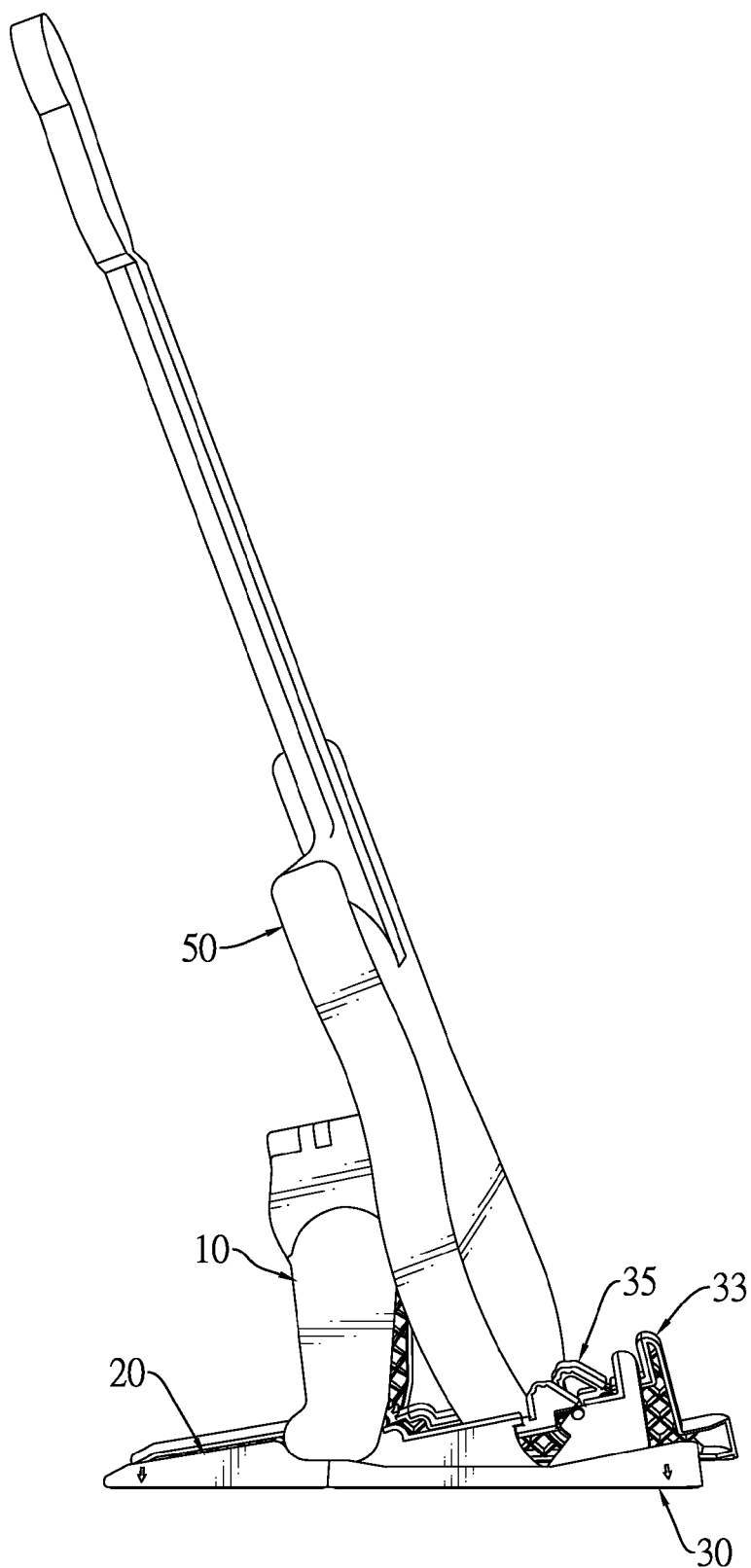
FIG. 8 is a perspective view of the portable guitar stand in FIG. 1, shown placed with a guitar of relatively small thickness.
Figure 9:
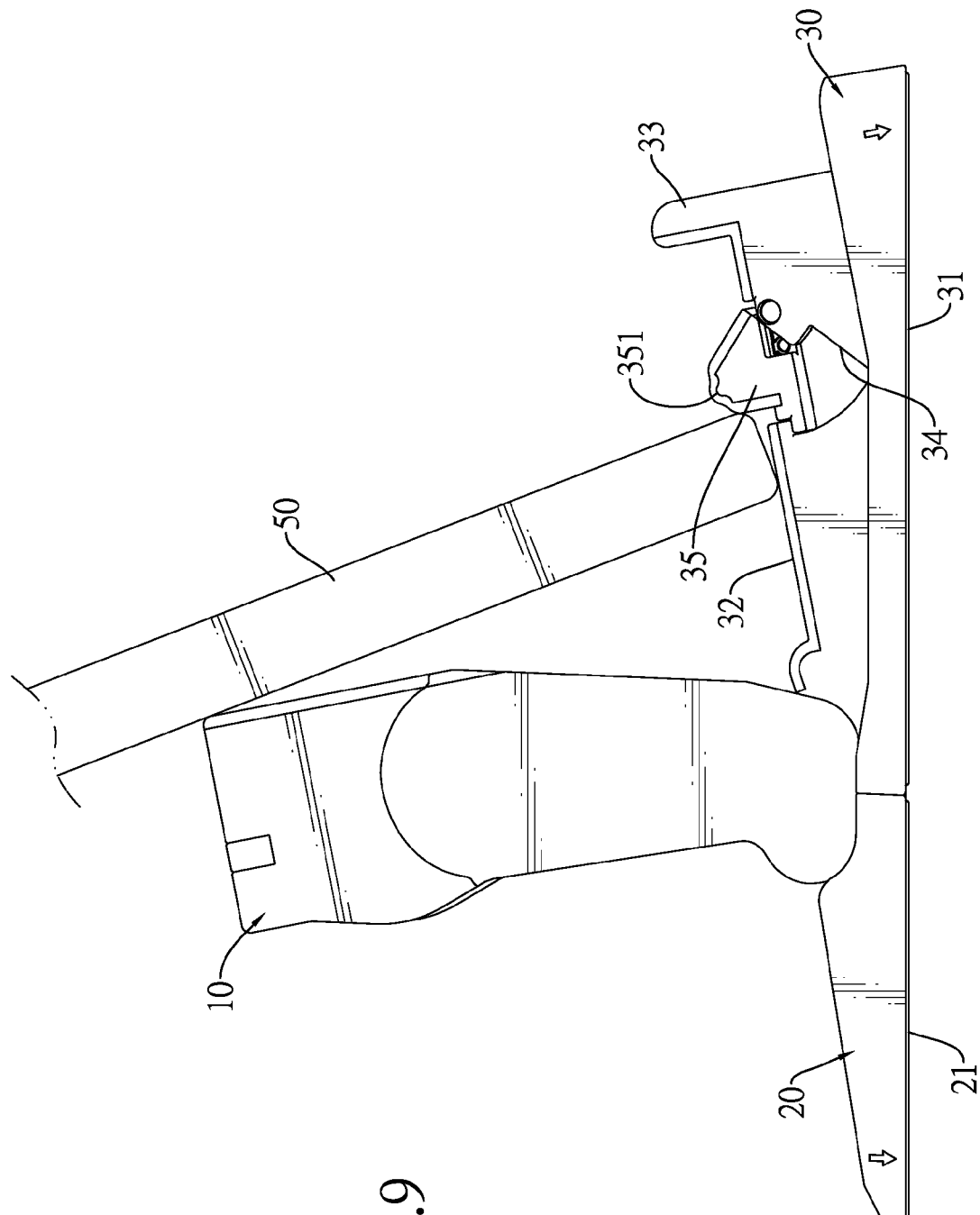
FIG. 9 is a partial enlarged front view of the portable guitar stand in FIG. 1, shown placed with a guitar of relatively small thickness.
Figure 10:
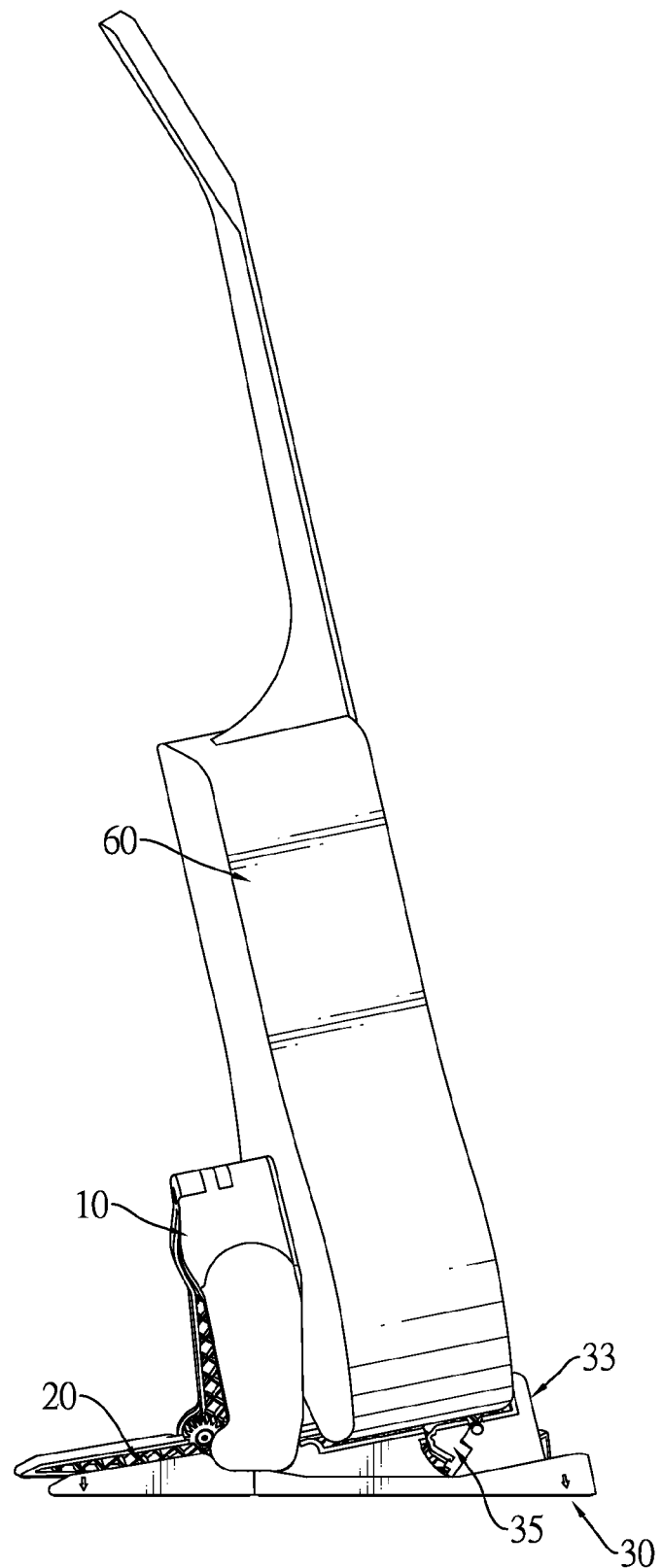
FIG. 10 is a perspective view of the portable guitar stand in FIG. 1, shown placed with a guitar of relatively large thickness.
Figure 11:
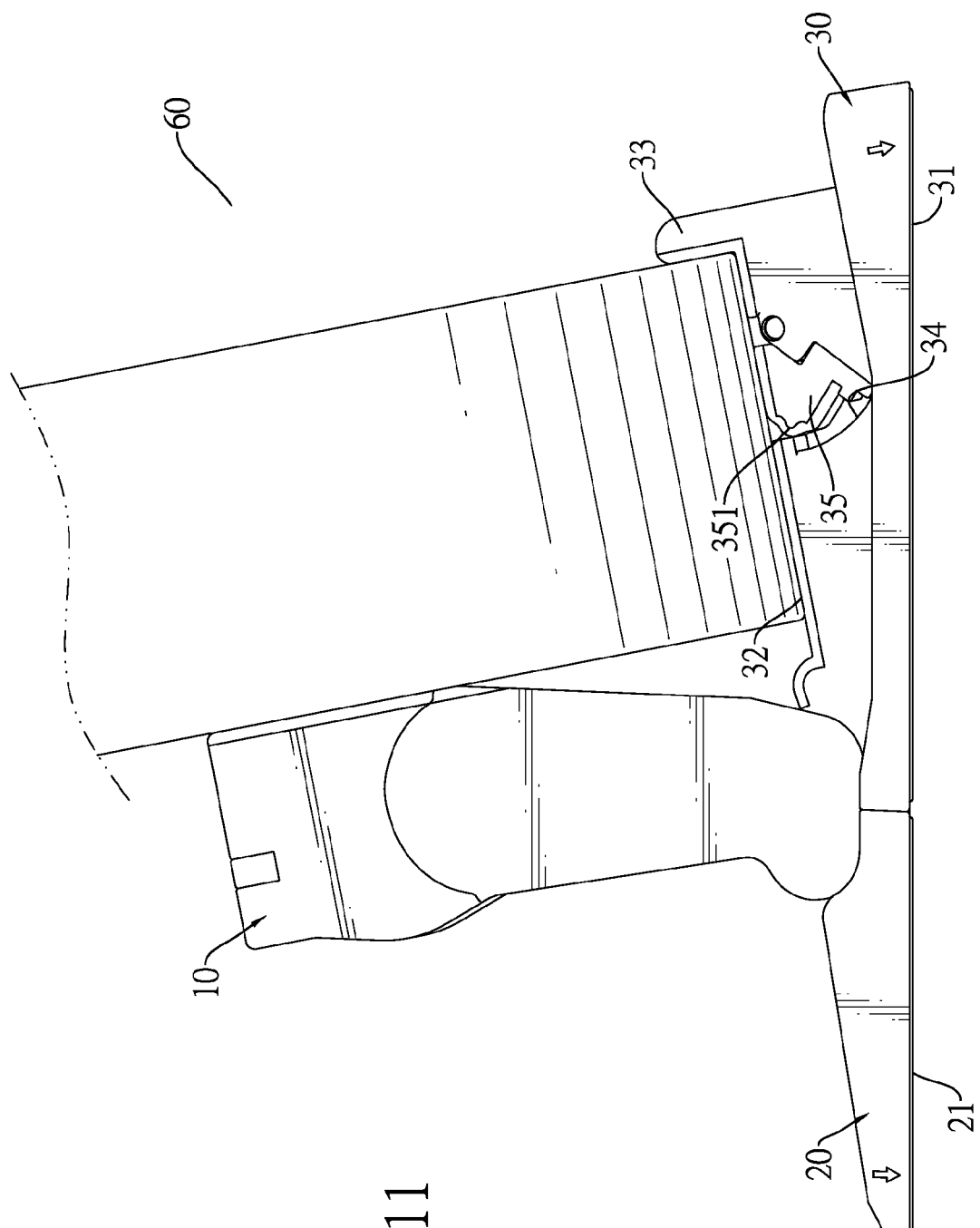
FIG. 11 is a partial enlarged front view of the portable guitar stand in FIG. 1, shown placed with a guitar of relatively large thickness.

With reference to FIGS. 8 to 11, the rotatable holding panel 35 and the stop 33 make the guitar stand adaptable for guitars of different sizes such as an acoustic guitar or an electric guitar. With reference to FIGS. 8 and 9, when the holding racks 30 are placed with a guitar 50 of relatively small thickness such as an acoustic guitar, two ends of the guitar 50 are clamped between the rotatable holding panel 35 and the stand rack 10. The torque of the torsion spring 352 makes the rotatable holding panel 35 abut an outer surface of the guitar 50. With reference to FIGS. 10 and 11, when the holding racks 30 are placed with a guitar 60 of relatively large thickness such as an electric guitar, two ends of the guitar 60 are clamped between the stop 33 and the stand rack 10. The rotatable holding panel 35 is pressed down by the guitar 60 and is rotated into the panel recess 34 to accommodate the relatively thick guitar 60.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A portable guitar stand comprising:
   two stand racks pivotally connected to each other, wherein the stand racks are adapted to support a vertical part of guitar;
   two supporting racks respectively and pivotally connected to the stand racks; each supporting rack having a pivot end pivotally connected to the stand rack; and
a free end;
two holding racks respectively and pivotally connected to the stand racks; each holding rack having
a pivot end pivotally connected to the corresponding stand rack;
a free end;
a top edge surface, wherein the top edge surface is adapted to support a bottom surface of guitar; and
a stop formed on the free end of the holding rack and protruding from the top edge surface of the holding rack;
wherein the holding rack and the supporting rack are pivotally connected to different sides of the stand rack;
when the guitar stand is folded, the stand racks, the supporting racks and the holding racks are parallel to each other; and
two synchronizing assemblies; each synchronizing assembly mounted between the pivot end of one of the supporting racks and the pivot end of the corresponding holding rack to make the supporting rack and the holding rack rotate synchronically.

2. The portable guitar stand as claimed in claim 1, wherein each supporting rack having
a bottom edge surface being transversely inclined from an outer side to an inner side of the supporting rack;
each holding rack having
a bottom edge surface being transversely inclined from an outer side to an inner side of the holding rack; and
when the guitar stand is expanded, the bottom edge surfaces of the supporting racks and the bottom edge surfaces of the holding racks are at a same plane.

3. The portable guitar stand as claimed in claim 2, wherein
the pivot end of each supporting rack is pivotally connected to the corresponding stand rack at a position on an inner surface of the corresponding stand rack and adjacent to a bottom of the corresponding stand rack; and
the pivot end of each holding rack is pivotally connected to the corresponding stand rack at a position on the inner surface of the corresponding stand rack and adjacent to the bottom of the corresponding stand rack.

4. The portable guitar stand as claimed in claim 3, wherein each synchronizing assembly has
a first gear mounted securely to the pivot end of the corresponding supporting rack, and pivotally connected to the corresponding stand rack; and
a second gear mounted securely to the pivot end of the corresponding holding rack, pivotally connected to the corresponding stand rack, and engaged with the first gear.

5. The portable guitar stand as claimed in claim 4, wherein each stand rack has
two sleeves formed on the inner surface of the stand rack, and respectively and pivotally connected to the first gear and the second gear of the corresponding synchronizing assembly.

6. The portable guitar stand as claimed in claim 5, wherein each holding rack has
a panel recess formed in the top edge surface of the holding rack;
a rotatable holding panel pivotally mounted in the panel recess; and
a torsion spring mounted on a pivot junction between the rotatable holding panel and the holding rack, and pressing the rotatable holding panel to make a top edge of the rotatable holding panel protrude out of the top edge surface of the holding rack.

7. The portable guitar stands as claimed in claim 6, wherein each stand rack has
a side edge surface being inclined from top to bottom;
a height of each supporting rack is decreased from the pivot end of the supporting rack to the free end of the supporting rack;
each supporting rack has
a top edge surface being inclined from the pivot end of the supporting rack to the free end of the supporting rack; and
when the guitar stand is folded, the side edge surface of each stand rack abuts the top edge surface of the corresponding stand rack.

8. The portable guitar stand as claimed in claim 7, wherein each stand rack has
an accommodating space formed in an inner surface of the stand rack; and
when each holding rack is rotated to be parallel to the corresponding stand rack, the holding rack is mounted in the accommodating space of said stand rack.

9. The portable guitar stand as claimed in claim 8 further comprising a pintle, wherein
each stand rack has
a pivot seat disposed in a top of the stand rack; and
the pintle is mounted through the pivot seats of the stand racks.

10. The portable guitar stand as claimed in claim 9, wherein
the pivot seat of one of the stand racks is a protrusion, and protrudes from the top of said stand rack;
the pivot seat of the other stand rack is a recess, and is formed in the top of said stand rack; and
the protrusion is mounted in the recess, and the pintle is mounted trough the protrusion and the recess.

11. The portable guitar stand as claimed in claim 1, wherein
the pivot end of each supporting rack is pivotally connected to the corresponding stand rack at a position on an inner surface of the corresponding stand rack and adjacent to a bottom of the corresponding stand rack; and
the pivot end of each holding rack is pivotally connected to the corresponding stand rack at a position on the inner surface of the corresponding stand rack and adjacent to the bottom of the corresponding stand rack.

12. The portable guitar stand as claimed in claim 11, wherein
each stand rack has
a side edge surface being inclined from top to bottom;
a height of each supporting rack is decreased from the pivot end of the supporting rack to the free end of the supporting rack;
each supporting rack has
a top edge surface being inclined from the pivot end of the supporting rack to the free end of the supporting rack; and
when the guitar stand is folded, the side edge surface of each stand rack abuts the top edge surface of the corresponding stand rack.

13. The portable guitar stand as claimed in claim 1, wherein each synchronizing assembly has
a first gear mounted securely to the pivot end of the corresponding supporting rack, and pivotally connected to the corresponding stand rack; and
a second gear mounted securely to the pivot end of the corresponding holding rack, pivotally connected to the corresponding stand rack, and engaged with the first gear.

14. The portable guitar stand as claimed in claim 13, wherein each stand rack has two sleeves formed on an inner surface of the stand rack, and respectively and pivotally connected to the first gear and the second gear of the corresponding synchronizing assembly.

15. The portable guitar stand as claimed in claim 1, wherein each holding rack has
   a panel recess formed in the top edge surface of the holding rack;
   a rotatable holding panel pivotally mounted in the panel recess; and
   a torsion spring mounted on a pivot junction between the rotatable holding panel and the holding rack, and pressing the rotatable holding panel to make a top edge of the rotatable holding panel protrude out of the top edge surface of the holding rack.

16. The portable guitar stand as claimed in claim 1, wherein each stand rack has
   an accommodating space formed in an inner surface of the stand rack; and
   when each holding rack is rotated to be parallel to the corresponding stand rack, the holding rack is mounted in the accommodating space of said stand rack.

17. The portable guitar stand as claimed in claim 1 further comprising a pintle, wherein
   each stand rack has
      a pivot seat disposed in a top of the stand rack; and
   the pintle is mounted through the pivot seats of the stand racks.

18. The portable guitar stand as claimed in claim 17, wherein
   the pivot seat of one of the stand racks is a protrusion, and protrudes from the top of said stand rack;
   the pivot seat of the other stand rack is a recess, and is formed in the top of said stand rack; and
   the protrusion is mounted in the recess, and the pintle is mounted trough the protrusion and the recess.

* * * * *